United States Patent
Boulineau et al.

(10) Patent No.: US 12,001,448 B2
(45) Date of Patent: Jun. 4, 2024

(54) MACHINE LEARNING SYSTEMS AND METHODS FOR DATA PLACEMENT IN DISTRIBUTED STORAGE

(71) Applicant: AMADEUS S.A.S., Biot (FR)

(72) Inventors: Vincent Boulineau, Antibes (FR); Jacques Bonaud, Cagnes sur mer (FR); Ahmed Oulabas, Valbonne (FR); Guillaume Deacken Owanssango, Roquefort les Pins (FR); David Renaudie, Valbonne (FR); Mohand Arezki Kessaci, Saint André de la Roche (FR)

(73) Assignee: AMADEUS S.A.S., Biot (FR)

( * ) Notice: Subject to any disclaimer, the term of this patent is extended or adjusted under 35 U.S.C. 154(b) by 989 days.

(21) Appl. No.: 16/933,274

(22) Filed: Jul. 20, 2020

(65) Prior Publication Data
US 2021/0035020 A1 Feb. 4, 2021

(30) Foreign Application Priority Data
Jul. 30, 2019 (FR) ...................... 1908659

(51) Int. Cl.
*G06F 16/27* (2019.01)
*G06F 16/29* (2019.01)
*G06N 20/00* (2019.01)

(52) U.S. Cl.
CPC ............ *G06F 16/27* (2019.01); *G06F 16/273* (2019.01); *G06F 16/275* (2019.01);
(Continued)

(58) Field of Classification Search
CPC ........ G06F 16/27; G06F 16/29; G06F 16/273; G06F 16/275; G06F 16/278; G06N 20/00
See application file for complete search history.

(56) References Cited

U.S. PATENT DOCUMENTS

| 8,918,392 B1* | 12/2014 | Brooker | H04L 67/1097 714/4.11 |
| 2014/0278623 A1* | 9/2014 | Martinez | G06Q 10/06 705/7.12 |

(Continued)

FOREIGN PATENT DOCUMENTS

CN 109104464 A 12/2018

OTHER PUBLICATIONS

Liao, Zhuofan, et al. "Deep learning-based data storage for low latency in data center networks." IEEE Access 7 (2019): 26411-26417.
(Continued)

*Primary Examiner* — Kris E Mackes
*Assistant Examiner* — Lin Lin M Htay
(74) *Attorney, Agent, or Firm* — Perry + Currier Inc.

(57) ABSTRACT

A method of determining a primary storage location for a data record in a distributed system comprising a plurality of data stores physically located in corresponding geographic locations, includes initialising a machine learning mapping model using topology information of the distributed system, and determining a set of training feature vectors derived from metadata values associated with prior location requests. The model is trained using the training feature vectors and a corresponding set of target primary storage locations. A location request that includes a plurality of metadata values and is associated with a data record is received, and the metadata values are processed to determine a prediction feature vector comprising a plurality of prediction feature values. The model is executed using the prediction feature vector to identify one data store of the plurality of data stores as the primary storage location for the data record associated with the location request.

14 Claims, 9 Drawing Sheets

(52) U.S. Cl.
CPC ............ *G06F 16/278* (2019.01); *G06F 16/29* (2019.01); *G06N 20/00* (2019.01)

(56) References Cited

U.S. PATENT DOCUMENTS

| | | | |
|---|---|---|---|
| 2016/0078361 A1* | 3/2016 | Brueckner | H04L 67/10 706/12 |
| 2018/0018590 A1* | 1/2018 | Szeto | G16H 50/20 |
| 2019/0034740 A1* | 1/2019 | Kwant | G06V 10/462 |
| 2019/0294934 A1* | 9/2019 | Shestak | G06V 20/588 |

OTHER PUBLICATIONS

Guo, Wei et al. "A data placement strategy based on genetic algorithm in cloud computing platform." 2013 10th Web Information System and Application Conference. IEEE, 2013.

* cited by examiner

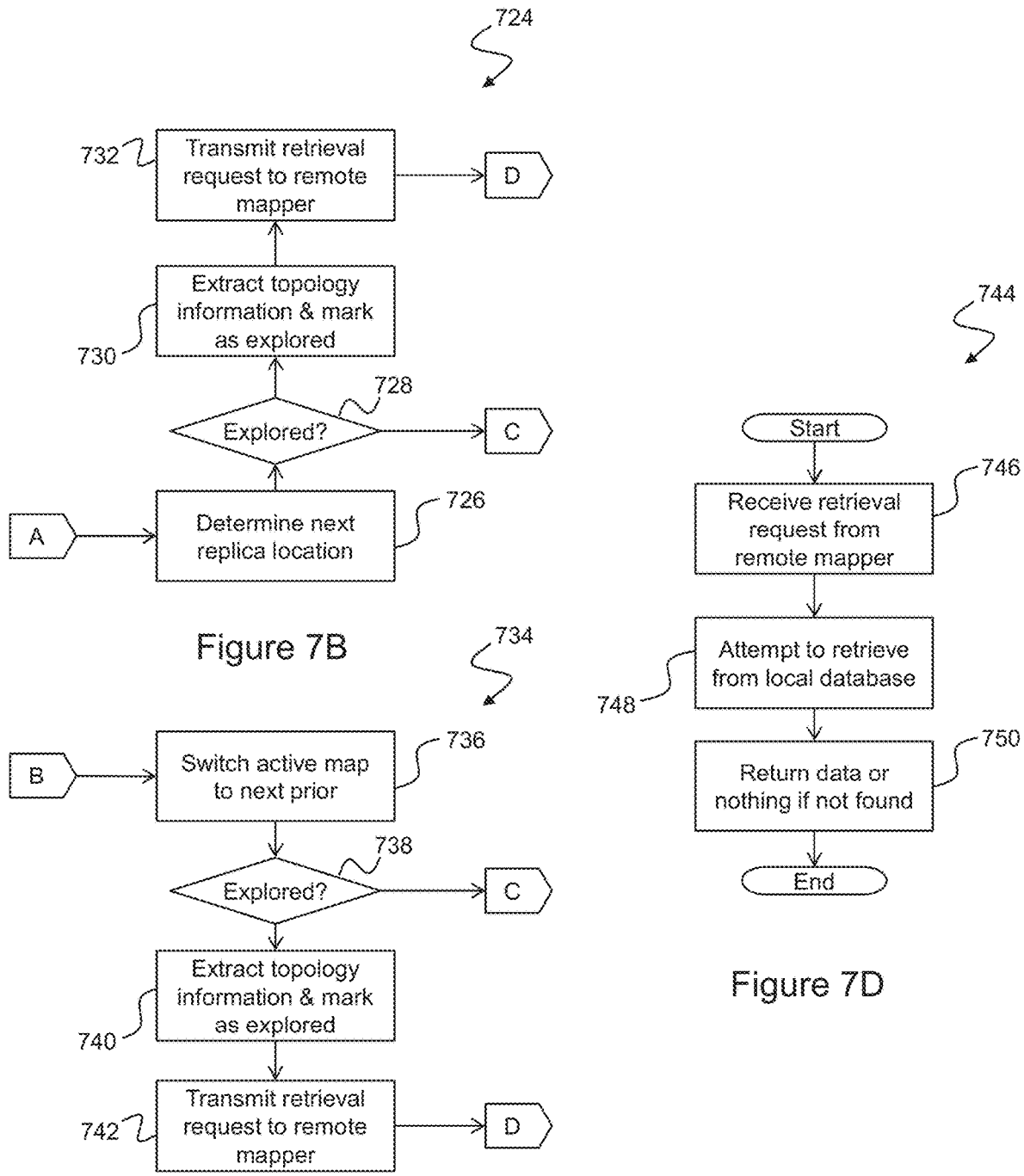

MACHINE LEARNING SYSTEMS AND METHODS FOR DATA PLACEMENT IN DISTRIBUTED STORAGE

CROSS-REFERENCE TO RELATED APPLICATION

This application claims priority to French patent application no. 1908659, filed Jul. 30, 2019, the contents of which is incorporated herein by reference.

FIELD

The present invention relates to distributed data storage and retrieval systems, such as cloud storage systems. More particularly, embodiments of the invention are directed to improved systems and methods for locating data within such systems.

BACKGROUND

Distributed information systems, e.g. cloud storage and cloud computing, are becoming increasingly common for hosting of data and applications. Cloud storage systems are deployed globally, and users of these systems are also located across wide geographic regions. The physically dispersed nature of cloud infrastructure creates new problems in ensuring low latency in data access. Geographic proximity between end users requesting data, and the data centres in which it is stored, is essential to minimising latency in high-performance applications.

A conventional approach to ensuring proximity, and reducing latency, is database replication. This means that multiple copies of the data held within a system are distributed to multiple regional data centres, such that there is always a copy available from a relatively local source when requested from anywhere in the world. However, replication has a number of disadvantages. There are costs associated with maintaining multiple copies, including the capital and operating costs of storage, as well as the operating costs of transferring large volumes of data between centres on a global scale. Additionally, replication creates the additional problem of managing consistency of the copies, i.e. ensuring that added or updated data is propagated in a timely and reliable manner to all replication locations.

In many applications, however, requirements for access to data are not geographically uniform. In the case of global ecommerce systems, certain products may be more popular in particular regions, such that requests for information about those products are more common in those regions, and rare in other regions. For example, requests relating to books, films, or music in a particular language are likely to be more common in places where that language in principally spoken, and rare in places where very few people speak the language. Similar considerations apply to other goods and services, such as perishable goods or travel services, where, for practical and logistical reasons, there is a strong association between geographical location and demand.

In such cases it may be advantageous to store data preferentially in locations proximate to where it is more likely to be required. In general, however, it may not be straightforward to do so. Predicting where data may be needed may be a complex task, involving many variables and considerations. One approach that has been explored in the prior art is based on traffic levels, i.e. preferentially storing data in locations that serve greater volumes of requests. However, while this approach may improve the average performance of the system in serving requests for data, simply because more of the data is available in location that serve a greater volume of requests, it does not account for geographic specificity of data requirements that may result in poor performance in lower-traffic locations. Furthermore, patterns of requests for information may vary over time, such that the preferred location to store particular data may change, independently of any variations in overall traffic distribution.

SUMMARY

It would be beneficial to provide new systems and methods for data placement within distributed information systems that are based upon geographical dependencies of data usage, and that are able to respond to variations in these dependencies over time. Embodiments of the present invention are directed to addressing this objective.

In one aspect the invention provides a computer-implemented method of determining a primary storage location for a data record in a distributed system which comprises a plurality of data stores, wherein each data store is physically located in a corresponding geographic location, the method comprising steps of: initialising a machine learning mapping model using topology information of the distributed system; determining a set of training feature vectors, the training feature vectors being derived from metadata values associated with a plurality of prior location requests; training the machine learning mapping model using the set of training feature vectors and a corresponding set of target primary storage locations; receiving a location request associated with a data record, the location request including a plurality of metadata values; processing the metadata values to determine a prediction feature vector comprising a plurality of prediction feature values; and executing the machine learning mapping model using the prediction feature vector to identify one data store of the plurality of data stores as the primary storage location for the data record associated with the location request.

Advantageously, embodiments of the invention are thereby able to determine data placement, for storage and retrieval of data within a distributed system, based upon characteristics of the data and associated request. Such characteristics are defined by the metadata values, which may comprise selected elements of the data itself and/or additional information associated with the data or request, such as its origin. The metadata values are used to compute feature values, which are aggregated into feature vectors that are used for training and execution of a machine learning model. In particular, training feature vectors are determined from past data and map performance, and used for training of the machine learning mapping model. Further, prediction feature vectors are determined from incoming requests and used as input when executing the trained machine learning mapping model to identify a corresponding predicted storage location. The machine learning model thus comprises a 'map' that may be used to locate data based upon patterns of data consumption, rather than upon secondary indications such as traffic volumes that may not be representative of geographic requirements for particular data.

Where the location request is associated with a write request, the method may further comprise writing the data record to the primary storage location identified by execution of the machine learning mapping model.

Where the location request is associated with a read request, the method may further comprise attempting to read the data record from the primary storage location identified by execution of the machine learning mapping model. In the event that the data record is not found in the primary storage location, the method may further comprise attempting to read the data record from one or more alternative storage locations selected from the plurality of data stores in the distributed system.

In embodiments, the primary storage location identified by execution of the machine learning mapping model may be a data store of the distributed system that is relatively remote from an origin of the read request, the plurality of data stores may include a preferred data store that is relatively local to the origin of the read request, and the method may further comprise recording details of the location request along with details of the preferred data store as a target primary storage location, for use in updating the machine learning mapping model.

Updating the model may comprise, in some embodiments, transmitting recorded details of one or more location requests and corresponding target primary storage locations to a cartography server of the distributed system, wherein the cartography server is configured to update the machine learning mapping model. An updated machine learning mapping model may subsequently be received from the cartography server.

Advantageously, in such embodiments the mapping model can be updated in response to performance of a current map. In particular, each execution of the model may result in either a 'hit', wherein the required data is found to be in a data store relatively local to the origin of the associated request, or a 'miss', wherein the required data is found to be in a data store relatively remote to the origin of the request. The occurrence of an excessive number of 'misses', either in absolute terms or relative to the number of 'hits' over a given time period, may be used to trigger a map update. A threshold may be determined for this trigger such that, on the one hand, map updates do not occur too frequently—which may result in excessive use of processing resources in training the mapping model, as well as instability in the system—while, on the other hand, updates occur frequently enough to improve data placement based upon experience, and to track any ongoing changes in data usage patterns.

In embodiments, the method may further comprise transmitting a copy of the machine learning mapping model to one or more mapper servers of the distributed system, wherein the mapper servers are configured to execute the machine learning mapping model to determine primary storage locations for data records based upon received location requests.

The method may then further comprise: receiving, by a cartography server from one or more of the mapper servers, details of one or more location requests and corresponding target primary storage locations for which, in each case, a primary storage location identified by execution of the transmitted copy of the machine learning mapping model is different from the target primary storage location; updating, by the cartography server, the set of training feature vectors based upon the received details of locations requests; and training, by the cartography server, the machine learning mapping model using the updated set of training feature vectors and a corresponding set of target primary storage locations.

In embodiments, the step of training the machine learning mapping model is performed once a threshold is reached in a number of the received details of one or more location requests and corresponding target primary storage locations for which, in each case, a primary storage location identified by execution of the transmitted copy of the machine learning mapping model is different from the target primary storage location. Advantageously, the threshold may be set such that such that, as has been noted above, the frequency of map updates strikes a balance between use of processing resources in training the mapping model along with system stability, and achieving ongoing improvements in data placement based upon experience along with tracking ongoing changes in data usage patterns.

Advantageously, the cartography server may associate an activation time with the updated machine learning mapping model, and the mapper servers may be configured to execute the updated machine learning mapping model to determine primary storage locations for data records based upon received location requests subsequent to the activation time. In this way, the activation and use of updated maps may be synchronised throughout the system.

In an exemplary embodiment, the data stores contain information having geographic significance, and the training and prediction feature vectors comprise geographic elements. More particularly, the information having geographic significance may comprise travel information, and one or more of the geographic elements may be selected from the group comprising: a requesting office identifier; a requesting office location identifier; a trip origin location identifier; a trip destination location identifier; a travel service provider identifier; a service day-of-week identifier; a service boarding location identifier; and a service offloading location identifier. Advantageously, the use of such geographic feature elements may exploit a synergy between the geographic distribution of the system itself, and the stored data, whereby the machine learning mapping model is able to outperform classical rule-based engines for data placement.

In another aspect, the invention provides a distributed system comprising: a plurality of data stores, wherein each data store is physically located in a corresponding geographic location; a plurality of mapper servers; and at least one cartography server, wherein the data store, mapper servers and cartography server are communicably connected via a distributed data network, wherein the cartography server is configured to generate a machine learning mapping model by: initialising the machine learning mapping model using topology information of the distributed data network; determining a set of training feature vectors, the training feature vectors being derived from metadata values associated with a plurality of prior location requests; training the machine learning mapping model using the set of training feature vectors and associated locations of the plurality of data stores; and transmitting copies of the machine learning mapping model to the plurality of mapper servers, wherein each one of the plurality of mapper servers is configured to determine a primary storage location for a data record, from the plurality of data stores, by: receiving a copy of the machine learning mapping model from the cartography server; receiving a location request associated with the data record, the location request including a plurality of metadata values; processing the metadata values to determine a feature vector comprising a plurality of feature values; and executing the machine learning mapping model using the feature vector to identify one data store of the plurality of data stores as the primary storage location for the data record associated with the location request.

In a further aspect, the invention provides a computer-implemented method of determining a primary storage location for a data record in a distributed system which comprises a plurality of data stores, wherein each data store is physically located in a corresponding geographic location, the method comprising steps of: receiving a location request associated with the data record, the location request including a plurality of metadata values; processing the metadata values to determine a feature vector comprising a plurality of feature values; and executing a machine learning mapping model using the feature vector to identify one data store of the plurality of data stores as the primary storage location for the data record associated with the location request, the mapping model having been initialised using topology information of the distributed system and trained using a set of training feature vectors and associated target primary storage locations, the training feature vectors being derived from metadata values associated with a plurality of prior location requests.

In a further aspect, the invention provides a computer implemented method of generating a machine learning mapping model configured to determine a primary storage location for a data record in a distributed system which comprises a plurality of data stores, wherein each data store is physically located in a corresponding geographic location, the method comprising steps of: initialising the machine learning mapping model using topology information of the distributed system; determining a set of training feature vectors, the training feature vectors being derived from metadata values associated with a plurality of prior location requests; and training the machine learning mapping model using the set of training feature vectors and a corresponding set of target primary storage locations.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTIONS OF THE DRAWINGS

Embodiments of the invention will now be described with reference to the accompanying drawings, in which like reference numerals refer to like features, and wherein.

Figure 3:
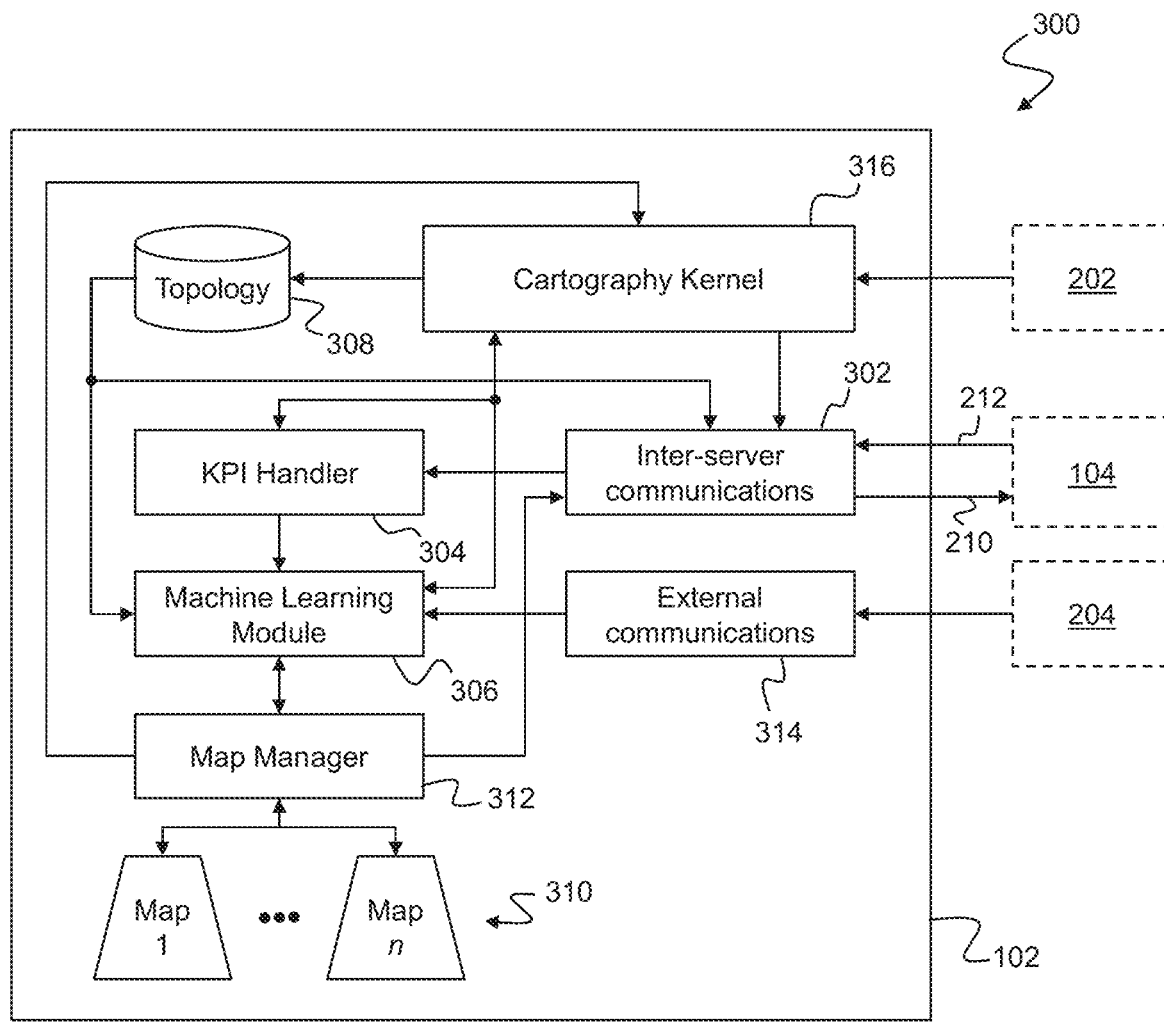
FIG. 3 is a block diagram of a cartography server architecture embodying the invention.
Figure 4:
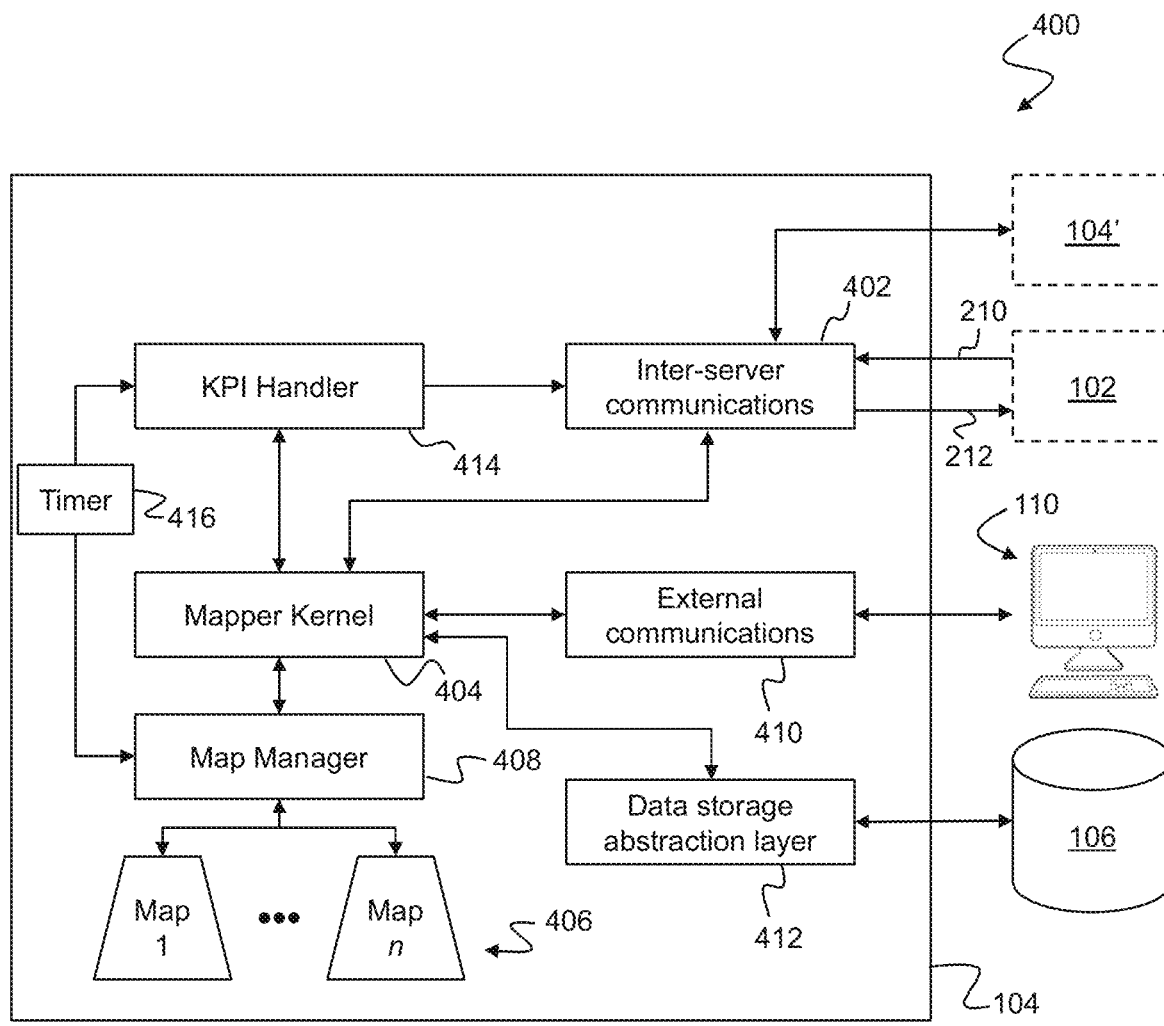
FIG. 4 is a block diagram of a mapper server architecture embodying the invention.
Figure 5:
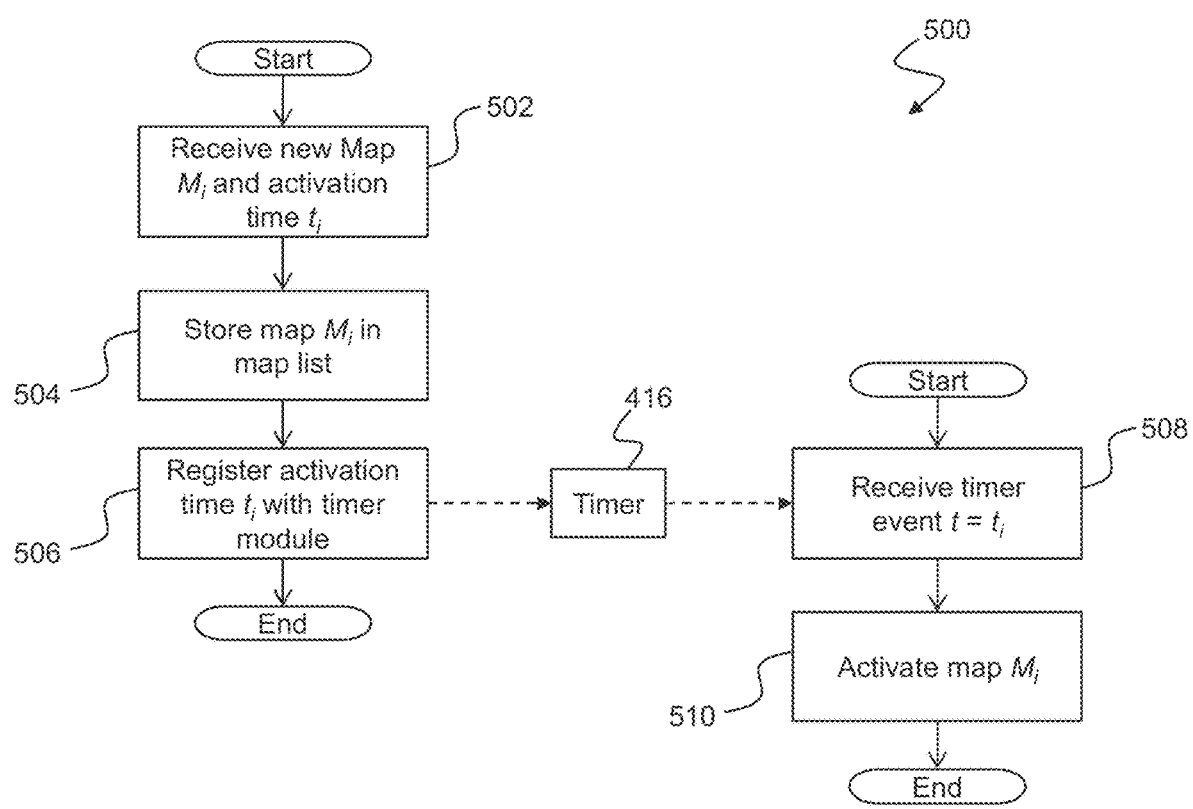
FIG. 5 is a flowchart illustrating an exemplary method of map replacement executed by the mapper server of FIG. 4.
Figure 7A:
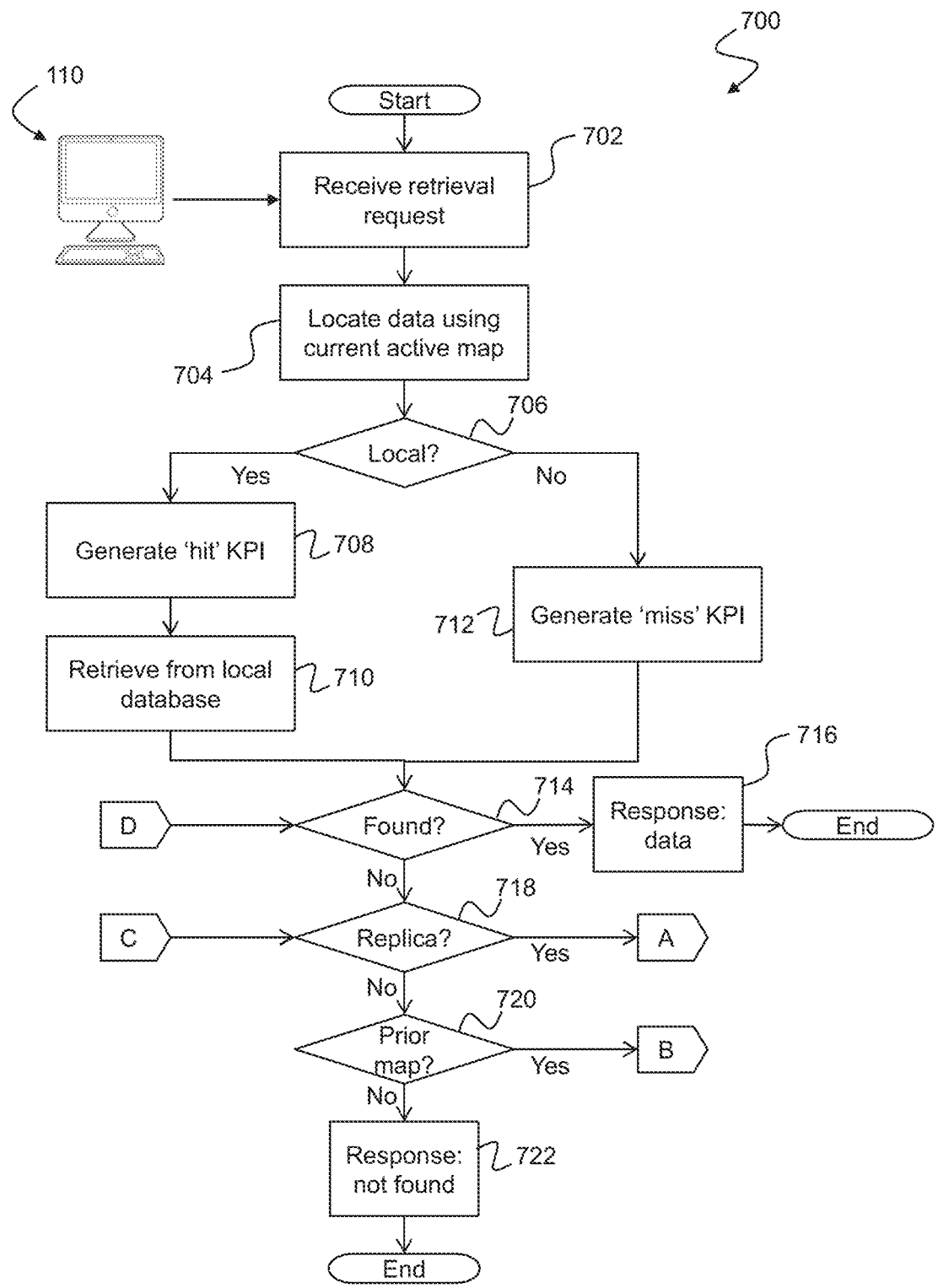
Figure 8:
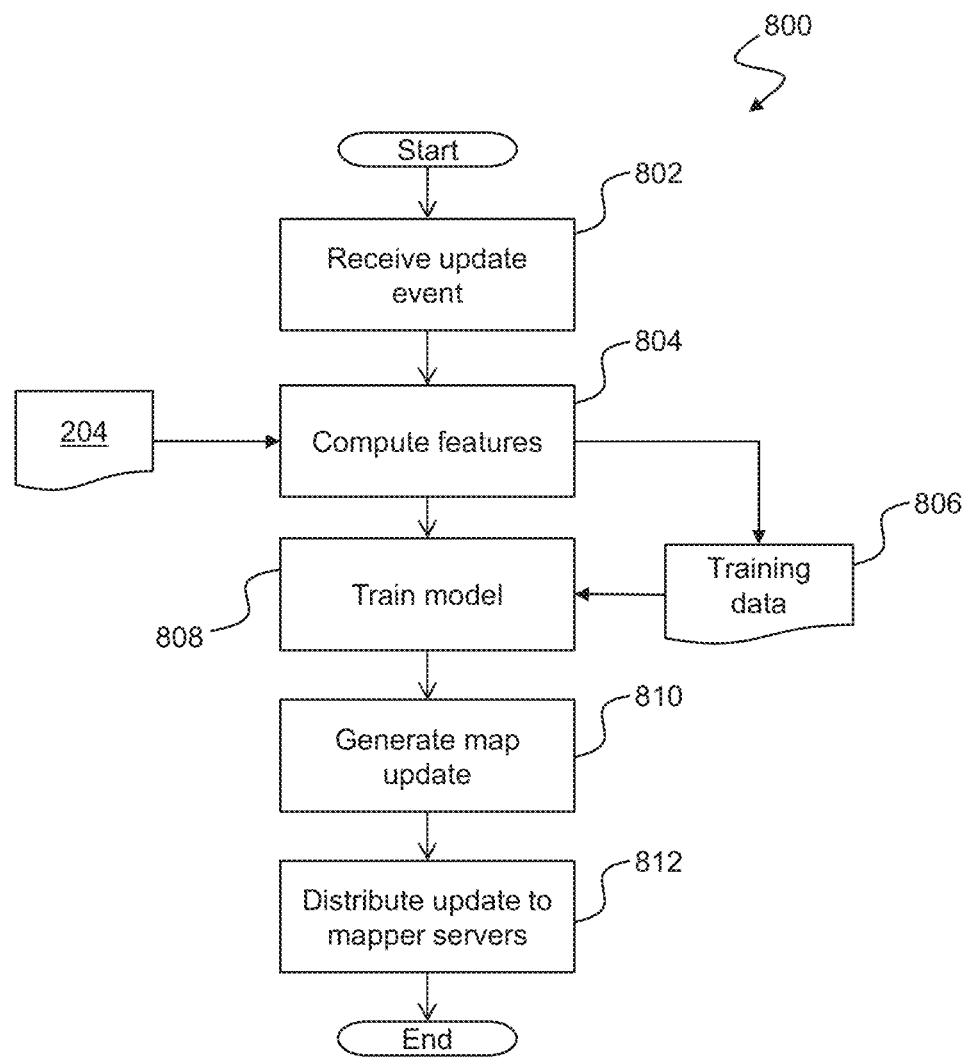

FIGS. 7A, 7B, 7C, and 7D show flowcharts illustrating an exemplary method of data retrieval executed by the mapper server of FIG. 4; and FIG. 8 is a flowchart illustrating an exemplary method of map updating executed by the cartography server of FIG. 3.

DETAILED DESCRIPTION

Figure 1:
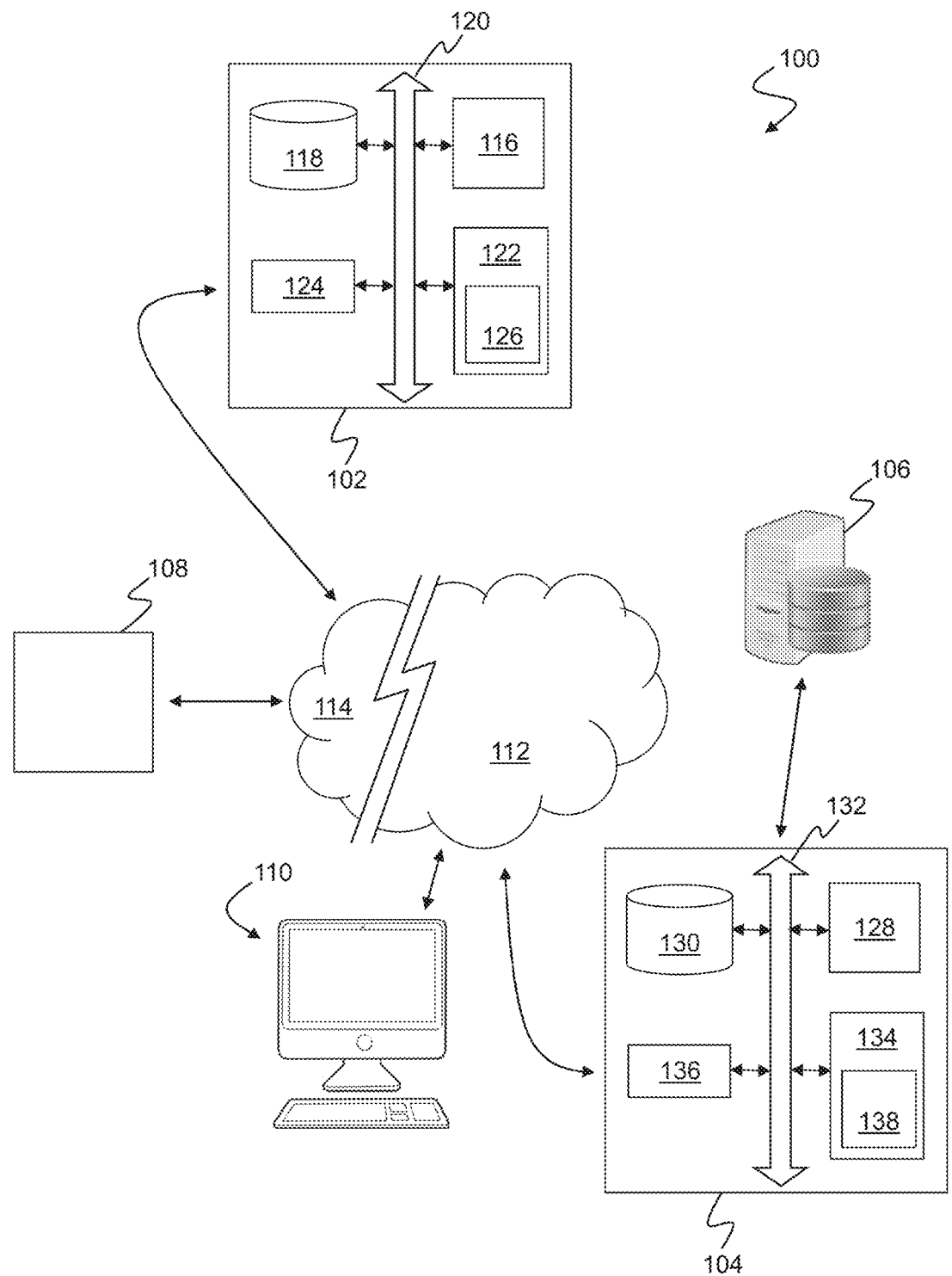
FIG. 1 is a schematic diagram of a cloud-based distributed data storage and retrieval system embodying the invention.

FIG. 1 is a block diagram illustrating a first exemplary networked system comprising a distributed data storage and retrieval system 100 including a cartography server 102 and a mapper server 104 embodying the invention. A data storage unit, i.e. database 106, is associated with the mapper server 104. The system 100 includes further geographically distributed nodes, e.g. 108, each of which may comprise at least one mapper server similar to the server 104 operably associated with one or more data storage units similar to the database 106, as will be described in greater detail below with reference to FIG. 2.

The cartography server 102 comprises a machine learning (ML) based system configured to generate and distribute trained models—equivalently termed 'maps' in this description—configured to determine preferred placement of data within the distributed system 100. Specifically, maps generated by the cartography server are distributed to a plurality of mapper servers, such as the mapper server 104 shown in FIG. 1. The mapper servers execute the distributed maps to determine preferred placement of data in response to requests received from actors, such as users of the distributed storage system 100 as represented by the user terminal 110.

The system 100 may be distributed over a very wide geographic area, and in particular may be a global system interconnected via the internet. In such a system, placement of data may have a significant impact on performance and operating costs. For example, a terminal 110 which requests data retrieval will typically receive a faster response if the required data is located in a database 106 connected to a relatively local part of the internet 112, compared to the response time if the data is located in a database associated with a node 108 that is connected to a relatively distance part of the internet 114. Furthermore, if data is preferentially stored in databases, e.g. 106, that are relatively local to the users, e.g. of terminal 110, that are most likely to request that data, operating costs of the system 100 may be reduced, by minimising the need to transfer data between storage locations 106, 108, and/or to maintain distributed replicas of data.

The cartography server 102 may comprise a computer system having a conventional architecture. In particular, the cartography server 102, as illustrated, comprises a processor 116. The processor 116 is operably associated with a non-volatile memory/storage device 118, e.g. via one or more data/address busses 120 as shown. The non-volatile storage 118 may be a hard disk drive, and/or may include a solid-state non-volatile memory, such as ROM, flash memory, solid-state drive (SSD), or the like. The processor 116 is also interfaced to volatile storage 122, such as RAM, which contains program instructions and transient data relating to the operation of the cartography server 102.

In a conventional configuration, the storage device 118 maintains known program and data content relevant to the normal operation of the cartography server 102. For example, the storage device 118 may contain operating system programs and data, as well as other executable application software necessary for the intended functions of the cartography server 102. The storage device 118 also contains program instructions which, when executed by the processor 116, cause the cartography server 102 to perform operations relating to an embodiment of the present invention, such as are described in greater detail below, with reference to FIGS. 2, 3, and 8. In operation, instructions and data held on the storage device 118 are transferred to volatile memory 122 for execution on demand.

The processor 116 is also operably associated with a communications interface 124 in a conventional manner.

The communications interface 124 facilitates access to a wide-area data communications network, such as the Internet 114.

In use, the volatile storage 122 contains a corresponding body 126 of program instructions transferred from the storage device 118 and configured to perform processing and other operations embodying features of the present invention. The program instructions 126 comprise a technical contribution to the art developed and configured specifically to implement an embodiment of the invention, over and above well-understood, routine, and conventional activity in relation to distributed data storage, as further described below, particularly with reference to FIGS. 2, 3, and 8.

Similarly, the mapper server 104—which is representative of a plurality of mapper servers present in a practical embodiment of the invention—may also comprise a computer system having a conventional architecture. In particular, the mapper server 104, as illustrated, comprises a processor 128, which is operably associated with a non-volatile memory/storage device 130, via one or more data/address busses 132. The processor 128 is also interfaced to volatile storage 134, which contains program instructions and transient data relating to the operation of the mapper server 104.

The storage device 130 maintains known program and data content relevant to the normal operation of the mapper server 104, such as operating system programs and data, as well as other executable application software necessary for the intended functions of the mapper server 104. The storage device 130 also contains program instructions which, when executed by the processor 128, cause the mapper server 104 to perform operations relating to an embodiment of the present invention, such as are described in greater detail below, with reference to FIGS. 2, and 4 to 7. In operation, instructions and data held on the storage device 130 are transferred to volatile memory 134 for execution on demand.

The processor 128 is also operably associated with a communications interface 136, which facilitates access to a wide-area data communications network, such as the Internet 112.

In use, the volatile storage 134 contains a corresponding body 138 of program instructions transferred from the storage device 130 and configured to perform processing and other operations embodying features of the present invention. The program instructions 138 comprise a technical contribution to the art developed and configured specifically to implement an embodiment of the invention, over and above well-understood, routine, and conventional activity in relation to distributed data storage, as further described below, particularly with reference to FIGS. 2, and 4 to 7.

With regard to the preceding overview of the cartography and mapper servers 102, 104, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms.

Computing systems may include conventional personal computer architectures, or other general-purpose hardware platforms. Software may include open-source and/or commercially available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as server-class computing devices, desktop PCs, notebook or laptop PCs, smartphones, tablet computers, and so forth.

In particular, the terms 'processing unit' and 'module' are used in this specification to refer to any suitable combination of hardware and software configured to perform a particular defined task, such as storing and retrieving data, processing data, computing input features of one or more machine learning models, executing training and/or other configuration steps of one or more machine learning models, or executing machine learning models to determine preferred data storage/placement locations. Such processing units or modules may comprise executable code executing at a single location on a single processing device, or may comprise cooperating executable code modules executing in multiple locations and/or on multiple processing devices. For example, in some embodiments of the invention, operations of the cartography server 102 may be carried out entirely by code executing on a single system, while in other embodiments corresponding processing may be performed in a distributed manner over a plurality of systems.

Software components, e.g. program instructions 126, 138, embodying features of the invention may be developed using any suitable programming language, development environment, or combinations of languages and development environments, as will be familiar to persons skilled in the art of software engineering. For example, suitable software may be developed using the C programming language, the Java programming language, the Scala programming language, the C++ programming language, the Go programming language, the Python programming language, the R programming language, and/or other languages suitable for implementation of machine learning and other algorithms. Development of machine learning models embodying the invention may be supported by the use of machine learning code libraries such as the TensorFlow, PyTorch, Keras, CatBoost, H20, and XGBoost libraries. It will be appreciated by skilled persons, however, that embodiments of the invention involve the implementation of software structures and code that are not well-understood, routine, or conventional in the art of machine learning systems, and that while pre-existing libraries may assist implementation, they require specific configuration and extensive augmentation (i.e. additional code development) in order to realise various benefits and advantages of the invention and implement the specific structures, processing, computations, and algorithms described below, particularly with reference to FIGS. 2 to 8.

The foregoing examples of languages, environments, and code libraries are not intended to be limiting, and it will be appreciated that any convenient languages, libraries, and development systems may be employed, in accordance with system requirements. The descriptions, block diagrams, flowcharts, tables, and so forth, presented in this specification are provided, by way of example, to enable those skilled in the arts of software engineering and machine learning to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media may include volatile and non-volatile, and removable and non-removable, tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. While a computer readable storage medium may not comprise transitory signals per se (e.g. radio waves or other propagating electromagnetic waves, electromagnetic waves propagating through a transmission media such as a waveguide, or electrical signals transmitted through a wire), computer readable program instructions may be downloaded via such transitory signals to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

Figure 2:
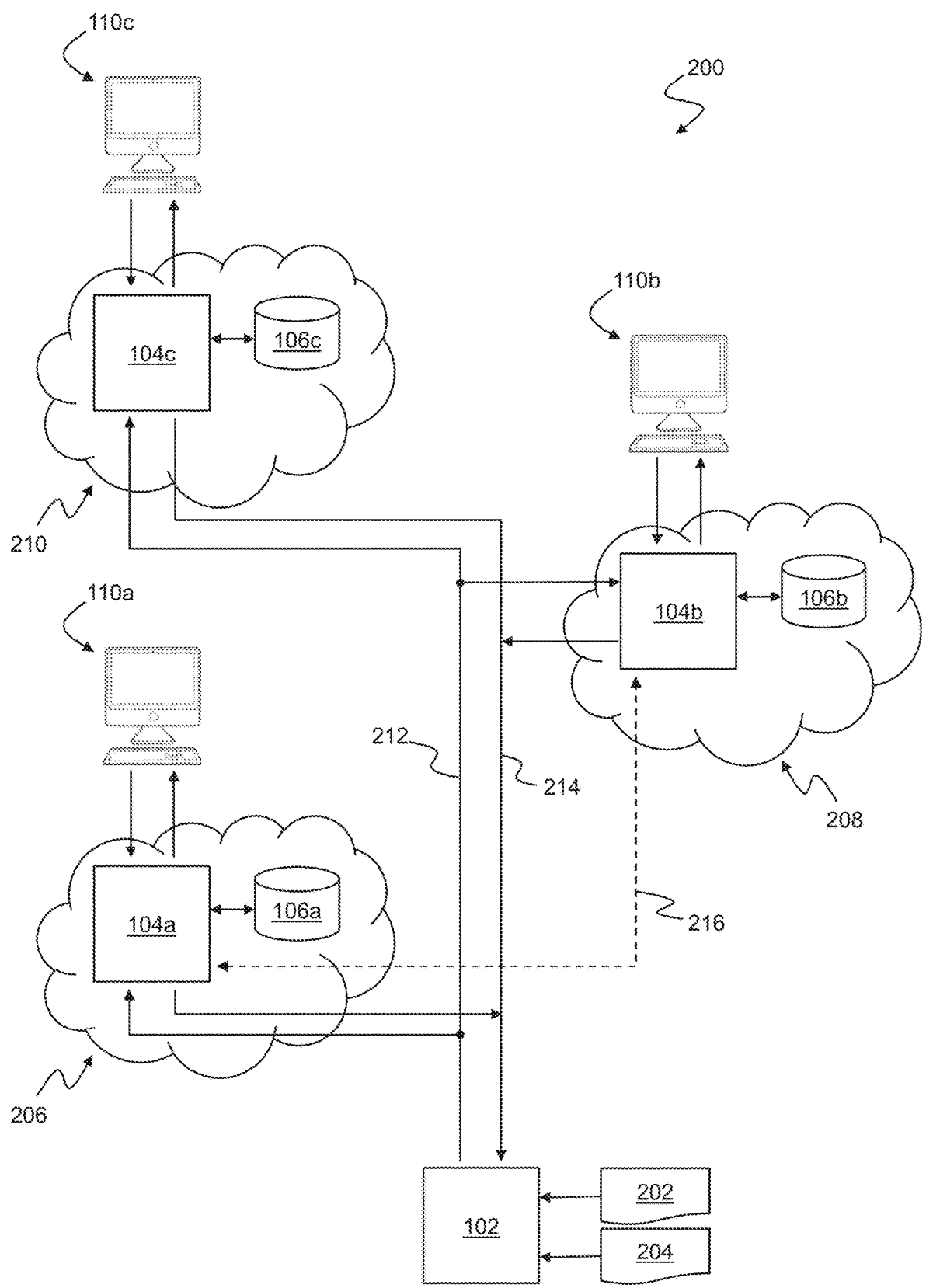
FIG. 2 is a block diagram illustrating a high-level architecture of the system of FIG. 1.

Turning now to FIG. 2, there is shown is a block diagram illustrating a high-level architecture 200 which is exemplary of the system 100 of FIG. 1. In the example 200, a single cartography server 102 communicates with three geographically distributed mapper servers 104a, 104b, 104c. Associated with each mapper server is a corresponding, relatively local, database 106a, 106b, 106c. Each mapper server services storage and retrieval request on behalf of one or more relatively local users 110a, 110b, 110c of the system 200. In accordance with embodiments of the invention, the cartography server 102 generates and distributes trained machine learning models, i.e. maps, to the mapper servers 104a, 104b, 104c. The maps are configured to output a preferred location for storage of data based upon input features derived from characteristics of the data to be stored. These characteristics, which may comprise selected elements of the data itself and/or additional information associated with the data or request, such as its origin, are termed 'metadata' within this description.

In brief, therefore, the maps generated and distributed by the cartography server 102 to the mapper servers 104a, 104b, 104c, are configured to translate from metadata to a preferred storage location of the available databases 106a, 106b, 106c within the system 200. The mapper servers 104a, 104b, 104c use these maps to determine where to store data such that it will, in operation, preferably be located at the storage location (or locations) closest to which it will most commonly be required. Thus, for example, data that is most likely to be required by a user 110a should preferably be stored in database 106a, data that is most likely to be required by a user 110b should preferably be stored in database 106b, and data that is most likely to be required by a user 110c should preferably be stored in database 106c.

To facilitate generation of the maps, the cartography server receives external input in the form of topology information 202 of the distributed system 200. The topology information 202 may include data describing the relative and/or absolute locations 206, 208, 210 of the mapper servers 104a, 104b, 104c and databases 106a, 106b, 106c within the system 200, as well as other system characteristics, such as storage capacity and associated costs of each database. Software executing on the cartography server is thereby able to determine which locations are relatively local or remote from each other, and also calculate the costs and benefits of available storage strategies, in terms of costs and availability of data transfer and storage within the system 200.

The cartography server also receives external input 204 relating to the data stored within the system 200. The input 204 may comprise a data model which identifies, for example, elements and characteristics of the data that are considered to be metadata that is relevant to determining preferred data storage locations. Advantageously, software executing on the cartography server is thereby able to avoid unnecessary processing of data that is not relevant to its preferred storage location. The input 204 may further comprise training data for use in generating maps, i.e. one or more datasets based on past data usage patterns and/or simulation that can be used for prediction of preferred data storage locations.

The system 200 further comprises logical communications channels 212, 214 between the cartography server 102 and the mapper servers 104a, 104b, 104c. The communications channel 212 s directed from the cartography server 102 to the mapper servers 104a, 104b, 104c, and is used to transmit updated maps. The communications channel 214 is directed from the mapper servers 104a, 104b, 104c to the cartography server 102, and is used to transmit data relating to the performance of the distributed maps. In particular, each of the mapper servers 104a, 104b, 104c gathers data on the extent to which the current maps are successful in producing desirable local data placements. This data may be aggregated, and transmitted periodically back to the cartography server 102 via the communications channel 214 for use in generating updated maps. Within this description, such performance data is termed a 'key performance indicator', or 'KPI'.

A further logical communications channel 216 is shown schematically linking the mapper servers 104a, 104b, and exemplifies the ability of the mapper servers to communicate between one another, e.g. in order to query, retrieve, or store data held within remote databases, e.g. 106b, 106a.

It should be noted that while a single mapper server (i.e. one of the servers 104a, 104b, 104c) and a single associated database (i.e. one of the databases 106a, 106b, 106c) is shown at each location 206, 208, 210 in FIG. 2, in practice multiple mapper servers and/or databases may be provided at each location. In particular, it may be advantageous in embodiments of the invention to associate multiple mapper servers with each database. Additional mapper servers can be employed to provide redundancy in the case of failure of a mapper server, and/or may be operated in parallel to serve requests for storage and retrieval of data such that the system 200 has enhanced scalability in the presence of increased traffic load.

Further details of the operation of the cartography server 102, the mapper servers 104a, 104b, 104c, and the communications therebetween, will now be described with reference to architecture block diagrams shown in FIGS. 3 and 4, and flowcharts shown in FIGS. 5 to 8.

FIG. 3 is a block diagram 300 of a cartography server 102 architecture comprising software 126 specifically developed and configured to embody the invention. The cartography server 102 comprises an inter-server communications module 302, which is responsible for managing communications between the cartography server 102 and the mapper servers 104. In particular, the inter-server communications module 302 manages transmission of maps to the mapper servers 104 via the outgoing logical communications channel 210, and reception of KPI data from the mapper servers 104 via the incoming logical communications channel 212. The inter-server communications module 302 is configured specifically to implement any required protocols, including security protocols such as encryption and/or data signing, for communication with the mapper servers 104, and to manage associations between map data, KPI data, the data model, and topology.

Incoming KPI data is transferred by the inter-server communications module 302 to a KPI handler module 304, which is responsible for aggregating and processing KPI data received from the mapper servers. In particular, incoming KPI data includes information relating to 'hits' (i.e. instances of data being available from a local database when requested) and 'misses' (i.e. instances of data being unavailable from a local database, and requiring remote retrieval, when requested). The KPI handler 304 processes this KPI data into a form whereby metadata associated with hits and misses is matched to corresponding preferred storage locations, such that it is suitable for use in subsequent map updates.

A machine learning module 306 receives processed KPI data from the KPI handler 306, along with system topology data 308, and other external inputs (discussed further below), and employs these inputs in training of machine learning models which are configured to translate from metadata to a preferred storage location. The trained models comprise the maps that are distributed to the mapper servers via the inter-server communications module 302.

At any given time, the cartography server may retain a number of maps 310, including a currently active map (e.g. 'Map 1'), and zero or more prior maps that have previously been generated and distributed. Storage and retrieval of these maps, as required, is managed by a map manager module 312. The map manager module 312 is also responsible for removal of maps when no longer required. Maps may be stored by date, for example, and removed when they reach a predetermined age. Alternatively, or additionally, older maps may be removed once a predetermined number of stored maps is reached.

An external communications module 314 is configured to receive additional external data 204. As discussed above, with reference to FIG. 2, the external data 204 may include a data model defining metadata for the information stored within the distributed system 200, and may further include one or more training datasets for use by the machine learning module 306. The external communications module 314 formats the external data 204, and transfers it to the machine learning module 306 for use in training of subsequent machine learning models.

Finally, a cartography kernel module 316 is responsible for overall coordination of operations of the other modules within the cartography server 102. Functions of the cartography kernel module include: receiving topology data 202 and updating the internal topology data store 308; triggering the generation of updated maps by the machine learning module 306; and triggering the distribution of updated maps by the inter-server communications module 302. Maps may be updated in response to a number of 'misses' processed by the KPI handler 304 exceeding a specified threshold, at which point the KPI handler may generate a corresponding event that is caught by the cartography kernel module 316. In response, the cartography kernel module 316 may signal the machine learning module 306 to commence generation of an updated map, based upon the latest processed KPI data provided by the KPI handler 304, the current topology 308, and additional training data received via the external communications module 314.

The cartography kernel module 316 may be further configured to take additional factors into account when triggering the generation and distribution of updated maps. For example, it is undesirable to distribute updated maps too frequently, because when a map is updated there will be data within the system 200 that has been stored in accordance with a previously active map. The update map will thus initially generate misses for data requests where the preferred storage location is different between the updated map and the previous map, until the data stored within the system 200 has been refreshed. In practice, therefore, it is desirable that the minimum time between map updates is somewhat greater than the average period within which stored data is refreshed. In particular embodiments of the invention, it has been found that a minimum map update period of at least around two-and-a-half times the data refresh period is suitable. The cartography kernel module 316 may thus be configured to enforce this minimum update period.

FIG. 4 is a block diagram 400 of a mapper server 104 architecture comprising software 138 specifically developed and configured to embody the invention. The mapper server 104 comprises an inter-server communications module 402, which is responsible for managing communications between the mapper server 104, the cartography server 102, and remote mapper servers 104'. In particular, the inter-server communications module 402 manages reception of maps from the cartography server 102 via the incoming logical communications channel 210, and transmission of KPI data to the cartography server 102 via the outgoing logical communications channel 212. The inter-server communications module 402 is configured specifically to implement any required protocols, including security protocols such as encryption and/or data signing, for communication with the cartography server 102, and remote mapper servers 104'.

A mapper kernel module 404 is responsible for core functionality of the mapper server 104. This core functionality includes: map update using maps received via the inter-server communications module 402 (described below with reference to FIG. 5); data storage (described below with reference to FIGS. 6A and 6B); and data search and retrieval (described below with reference to FIGS. 7A, 7B, 7C, and 7D).

At any given time, the mapper server may retain a number of maps 406, including a currently active map (e.g. 'Map 1'), and zero or more prior maps that have previously been generated and distributed. Storage and retrieval of these maps, as required, is managed by a map manager module 408. Maintaining multiple maps enables the mapper server 104, and more specifically the mapper kernel module 404, to search past locations of data following map updates, as described in greater detail below with reference to FIG. 7C. The map manager module 408 is also responsible for removal of maps when no longer required. Maps may be stored by date, for example, and removed when they reach a predetermined age. Alternatively, or additionally, older maps may be removed once a predetermined number of stored maps is reached.

An external communications module 410 is responsible for handling messages received from database clients, such as terminals 110, including requests to search/retrieve data, and to store data. Requests are transferred to the mapper kernel 404 for processing, and any results relayed back to the requester 110.

Storage to, searching of, and retrieval from the local database 106 is managed by a data storage abstraction layer module 412. The function of this module is to translate between an internal API presented to the mapper kernel 404, and an interface specific to the particular database 106 with which the mapper server is operably connected. This facilitates operation of the mapper server 104 with different database architectures, by provision of a suitable abstraction layer module 412 for each supported architecture.

A KPI handler module 414 is responsible for aggregating 'hit' and 'miss' results generated by the mapper kernel 404. The aggregated KPI data is transmitted to the cartography server 102 via the inter-server communications module 402. Timing of these transmissions is controlled by a timer module 416, which generates signals to the KPI handler 414 at time intervals suitable to provide the cartography server 102 with KPI updates.

As shown in FIG. 4, the timer module 416 also generates signals to the map manager 408. These signals are used to activate updated maps, as will now be described in greater detail with reference to FIG. 5, which shows a flowchart 500 illustrating an exemplary method of map replacement implemented within software 138 specifically developed and configured to embody the invention and executed by the mapper server 104.

In particular, at step 502, the mapper server 104 receives an updated map from the cartography server 102. The map, which is denoted Mi, is received via the inter-server communications module 402, and is initially processed by the mapper kernel 404. The map Mi has an associated activation time ti, which is set by the cartography server 102 to ensure that map updates are synchronised among the plurality of mapper servers 104. At step 504, the mapper kernel transfers the updated map to the map manager 408 for storage in the map list 406. At this stage, however, the map is not yet activated, and the mapper server 104 continues to operate using the currently active map. At step 506, the associated activation time ti is registered with the timer module 416.

When the current time reaches the registered activation time ti, the timer module 416 generates a signal which is caught by the map manager 408 at step 508 This triggers the map manager 408 to activate the updated map Mi at step 510. At this stage, the previously active map becomes a prior map, and the mapper server commences operation using the updated map Mi. The use of prior maps in data search and retrieval is described in greater detail below with reference to FIG. 7, and to FIG. 7C in particular.

Figure 6A:
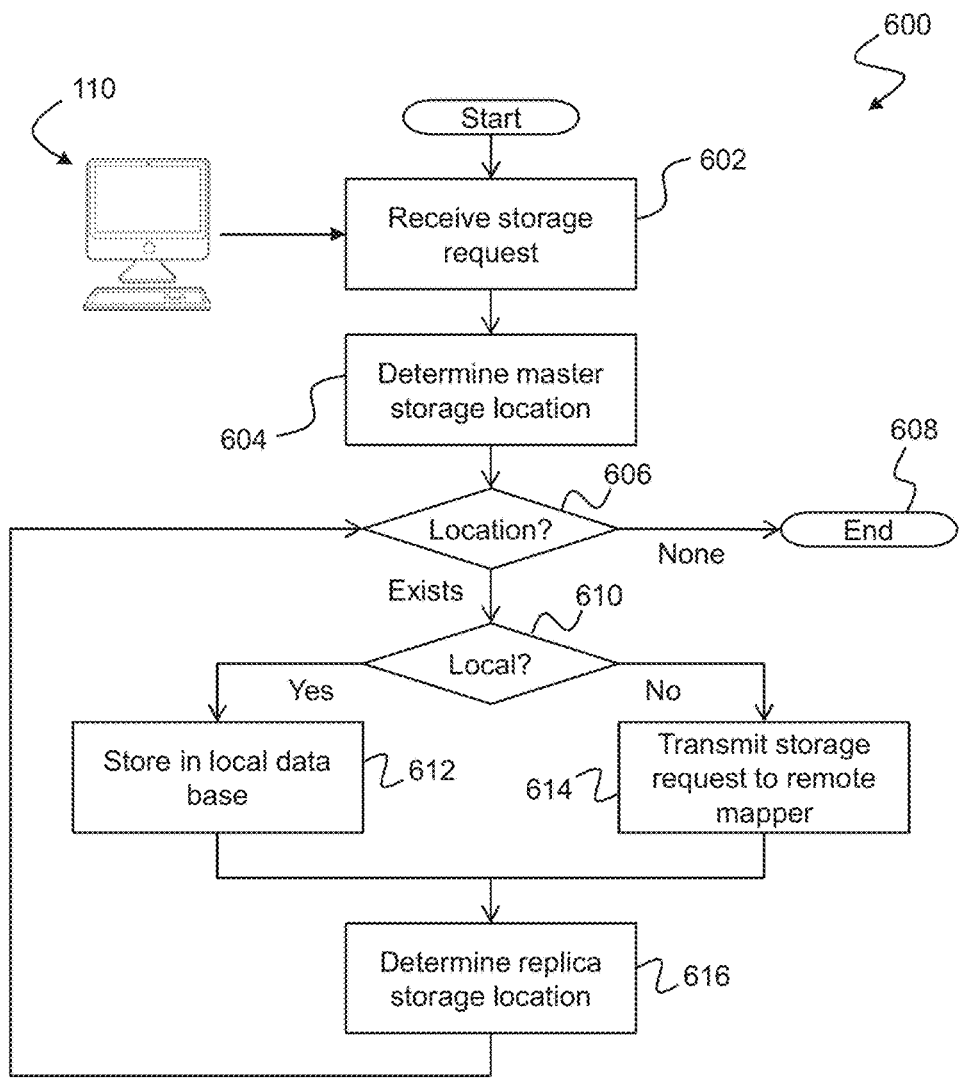
FIGS. 6A and 6B show flowcharts illustrating an exemplary method of data storage executed by the mapper server of FIG. 4.
Figure 6B:
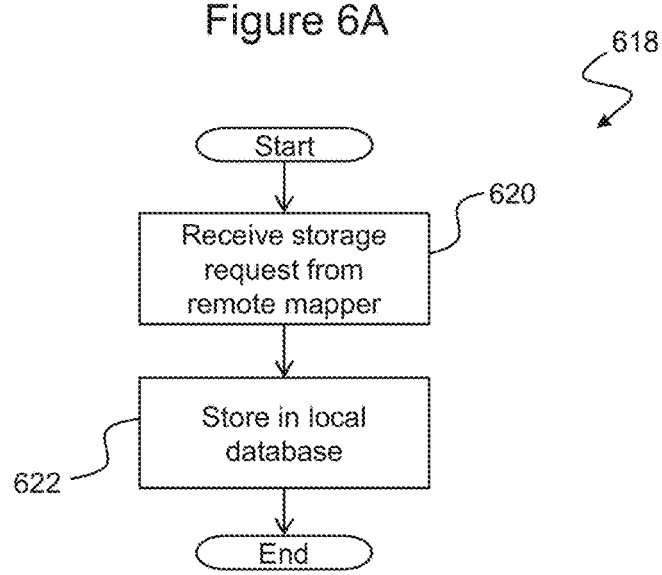

FIGS. 6A and 6B show flowcharts 600, 618 which collectively illustrate an exemplary method of data storage implemented within software 138 specifically developed and configured to embody the invention and executed by the mapper server 104.

In particular, as shown in FIG. 6A, at step 602 a request to store data is received from a requestor 110 via the external communications module 410, and is transferred to the mapper kernel module 404 for processing. The mapper kernel extracts relevant metadata from the storage request, and uses this metadata to derive a corresponding prediction feature vector which comprises a plurality of prediction feature values in accordance with the data model associated with the stored maps 406. At step 604, this prediction feature vector is used as input to execute the currently active map, which outputs the predicted preferred master storage location, which becomes the initial current storage location.

At step 606, existence of the current storage location is checked. Notably, in normal operation the initial current storage location, generated by execution of the currently active map, should always exist, and this check is primarily to ensure that the process 600 terminates 608 once the data has been stored at all required locations, including any replicas.

At step 610, the current storage location is checked to determine whether it is local, or remote (i.e. associated with another, geographically distant, mapper server). If local, control passes to step 612, in which the data is stored in the local database 106 via the data storage abstraction layer module 412. In the case of remote storage, control passes to step 614, in which a storage request is sent via the inter-server communications module 402 to the relevant remote mapper server 104'.

At step 616, the location of any required replica storage for the data is determined. Replication is a common feature of distributed database systems, and may be employed in order to provide alternative local data sources and/or redundancy in the case of communications, server, or database outages. If a further replica location is found to exist, the storage steps are repeated until no further replica exists, at which point the process 600 terminates 608.

FIG. 6B illustrates the process 618 implemented at a remote mapper server 104' upon receipt 620 of a storage request from the originating mapper server 104 via the inter-server communications module, e.g. from step 614 described above. As shown, when a request comes from a source internal to the system 200, rather than from an external requestor 110, the data is simply stored 622 in the local database. That is, the process 600 of determining the preferred master storage location, and/or the location of any remote storage or replicas, is not duplicated in the case of a remote storage request.

FIGS. 7A, 7B, 7C, and 7D show flowcharts 700, 724, 734, 744 which collectively illustrate an exemplary method of data retrieval implemented within software 138 specifically developed and configured to embody the invention and executed by the mapper server 104.

In particular, as shown in FIG. 7A, at step 702 a request to retrieve data is received from a requestor 110 via the external communications module 410, and is transferred to the mapper kernel module 404 for processing. The mapper kernel extracts relevant metadata from the retrieval request, and uses this metadata to derive a corresponding prediction feature vector which comprises a plurality of prediction feature values in accordance with the data model associated with the stored maps 406. At step 704, this prediction feature vector is used as input to execute the currently active map, which outputs the predicted storage location of the requested data.

At step 706, the predicted storage location is checked to determine whether it is local, or remote (i.e. associated with another, geographically distant, mapper server). If local, control passes to step 708, in which a 'hit' KPI is sent to the KPI handler 414, indicating that the current map has successfully predicted the appropriate local storage location for the current request. The data requested data is then retrieved 710 from the local database 106 via the data storage abstraction layer module 412. However, if the predicted storage location is remote, then the data is not yet found, and is not present in the appropriate local storage location for the current request. Accordingly, at step 712 a 'miss' KPI is sent to the KPI handler 414.

At step 714 a check is performed to determine whether the requested data has been found. If so, then a response is sent 716 to the requestor 110 containing the successfully retrieved data. Otherwise, control passes to step 718, in which the mapper kernel module 404 attempts to identify a remote replica location for the requested data. If a potential location exists, the process 724 described below with reference to FIG. 7B is executed.

It is, however, possible that data may exist within the system 200, but not be found, as a result of a recent map update. In the event that the preferred and/or replica locations of the data change due to the map update, and the data has not yet been refreshed, it may be stored in accordance with a prior map. Accordingly, at step 720 a check is performed to determine whether there is a prior map that could provide a location for the requested data. If so, then the process 734 described below with reference to FIG. 7C is executed.

In the event that the requested data is not found locally, in a remote or replica location, or in a location determined using any available prior map, a response is sent 722 to the requestor 110 indicating that the data was not found.

The process 724 illustrated in FIG. 7B is executed to search a remote or replica location following step 718. At step 726 a potential next location to search is determined. At step 728 a check is performed on a list of locations that have already been explored, and if the new location is already on the list, control passes back to step 718. Otherwise, at step 730 the mapper kernel module 404 extracts topology information and adds the new location to the list of explored locations, before requesting retrieval of the data from the corresponding remote mapper server at step 732. The result, which may comprise the requested data, or a 'not found' indication, is then passed back to step 714.

The process 734 illustrated in FIG. 7C is executed to search for requested data using a prior map from the map list 406 following step 720. At step 736 the mapper kernel module 404 instructs the map manager module 408 to change the currently active map to the next available prior map. This map is then used to determine the corresponding prior preferred storage location of the requested data. At step 738 a check is performed on the list of locations that have already been explored, and if the new location is already on the list, control passes back to step 720. Otherwise, at step 740 the mapper kernel module 404 extracts topology information and adds the new location to the list of explored locations, before requesting retrieval of the data from the corresponding remote mapper server at step 742. The result, which may comprise the requested data, or a 'not found' indication, is then passed back to step 714.

FIG. 7D illustrates the process 744 implemented at a remote mapper server 104' upon receipt 746 of a retrieval request from the originating mapper server 104 via the inter-server communications module, e.g. from steps 732 or 742 described above. As shown, when a request comes from a source internal to the system 200, rather than from an external requestor 110, an attempt is made simply to retrieve the data 748 from the local database, and the result (which may be a 'not found' indication) is returned at step 750. That is, the process 700 of determining the preferred master storage location, the location of any remote storage or replicas, and/or a search using prior maps, is not duplicated in the case of a remote retrieval request.

FIG. 8 is a flowchart 800 illustrating an exemplary method of map updating implemented within software 126 specifically developed and configured to embody the invention and executed by the cartography server 102.

In particular, at step 802 the machine learning module 306 receives an update event. This event is generated by the KPI handler module 304 when it determines that performance of the currently active map is inadequate. This may occur when the number of 'miss' KPIs received from the mapper servers within the system 200 exceeds a threshold value, either in absolute terms, and/or relative to the number of 'hit' KPIs. At step 804, the machine learning module 306 receives data from the KPI handler module 304, along with any external training data 204, and applies the data model to extract relevant metadata corresponding with retrieval requests and compute corresponding training feature vectors, each of which is associated with a known preferred storage location. In the case of external training data 204, the preferred storage location may be provided within the data, while in the case of data received from the KPI handler module 304 the preferred storage location is determined from the 'hit' and 'miss' information aggregated by the KPI handler modules 414 of the mapper servers 104. This procedure results in a labelled training dataset 806, comprising a plurality of training samples, each of which consists of a training feature vector derived from request metadata and a corresponding categorical value representing the associated preferred storage location.

At step 808, a supervised learning algorithm is applied to train a machine learning model to predict preferred storage locations based upon corresponding training features derived from request metadata. In accordance with embodiments of the invention, this represents a multinomial classification problem, with the number of classes being equal to the number of storage locations. By way of specific example, for the system 200 shown in FIG. 2 there are three classes corresponding with the three locations 206, 208, 210. A number of machine learning algorithms are available that may be suitable for the generation of predictive multinomial classification models, and a particular example employing a distributed random forest implementation is described in further detail below. However, this example should not be considered to limit the scope of the invention to this specific implementation.

At step 810, the machine learning module 306 generates a map update, which comprises the trained model. An activation time is associated with the map update, to allow for distribution 812 of the new map to all mapper servers within the system 200 prior to activation, which has been described above with reference to Figure. In this way, the cartography server controls and synchronises map updates throughout the system 200.

While the foregoing technical description, and the principles of the invention, may be applied in a range of distributed data storage and retrieval applications, a specific example will now be provided, for purposes of further illustration only, which relates to the travel industry. It should be appreciated, however, that this example is intended to assist in understanding of the invention, and how it may be put into effect, but should not be regarded as limiting in any way the scope of the invention to this particular field of application. As will be appreciated, within the travel industry travel agents and other actors generate large volumes of search and booking requests continuously from locations around the entire world. The databases that handle such requests store travel information, such as airline schedules and seat availability, which conventionally is replicated in multiple locations to ensure that every request can be server from a location that is relatively local to the requester in order to satisfy fast response-time requirements. In practice, however, requests tend to be correlated with location, albeit in complex ways. For example, an agent located in North America, and typically acting on behalf of North American travellers, is much more likely to make search or booking requests for flights and itineraries originating and/or terminating in North America than for flights and itineraries originating and terminating in South-East Asia. Accordingly, this is an application in which it is anticipated that there may be benefits in placement of data within the globally distributed database in accordance with predicted usage.

The table below illustrates metadata associated with travel search requests, according to an exemplary data model.

| Line | Reject Time | Office | Origin | Destination | Airline | Date | Board | Off | TCC | DataCenter |
|---|---|---|---|---|---|---|---|---|---|---|
| 0 | 2019 Jan. 25 00:00:27 | SELOZ312U | CJJ | CJU | OZ | 2019 Feb. 5 | CJJ | CJU | SEL | ASIA |
| 1 | 2019 Jan. 25 00:00:25 | BJS1E2RAS | GOT | SHA | OR | 2019 Feb. 9 | GOT | DOH | SHA | ASIA |
| 2 | 2019 Jan. 25 00:00:25 | BJS1E2RAS | GOT | SHA | QR | 2019 Feb. 10 | DOH | PVG | SHA | ASIA |
| 3 | 2019 Jan. 25 00:00:27 | BJS1E2RAS | HGH | HGH | NH | 2019 Feb. 16 | HGH | KIX | SHA | ASIA |

| Metadata Element | Type | Example | Explanation |
|---|---|---|---|
| RejectTime | Datetime | 2019 Jan. 25 00:00:25 | Date and Time of the rejection |
| Office | Categorical | BJS1E2RAS | Office of the request |
| Origin | Categorical | GOT | Trip departure (airport) |
| Destination | Categorical | SHA | Trip arrival (airport) |
| Airline | Categorical | QR | Airline |
| Date | Date | 2019 Feb. 9 | Date of the trip |
| Board | Categorical | GOT | Board point of the flight. Might differ from the trip Origin in case of connecting flights |
| Off | Categorical | DOH | Off point of the flight. Might differ from the trip Destination in case of connecting flights |
| TCC | Categorical | SEL | True City Code of the request originator |

A particular set of metadata values may have a preferred data storage location. Thus, for each specific metadata instance, an associated label may be determined, corresponding with the preferred storage location. This is illustrated in the table below, which shows four exemplary rows of labelled metadata.

In an exemplary implementation, features are derived from the above metadata by replacing the 'RejectTime' element with two categorical features: 'RejectHour' (representing the hour, 0-23, of rejection); and RejectDoW (representing the day-of-week, 0-6, of rejection). Additionally, the trip Date is removed, and a feature 'FlightDoW' (representing the day-of-week, 0-6, of the flight) is added. The resulting feature set is illustrated in the table below, in which it will be noted that all of the features are now categorical, and that these features include a requesting office identifier ('Office'); a requesting office location identifier ('TCC'); a trip origin location identifier ('Origin'); a trip destination location identifier ('Destination'); a travel service provider identifier ('Airline'); a service day-of-week identifier ('FlightDoW'); a service boarding location identifier ('Board'); and a service offloading location identifier ('Off').

| Feature | Type | Example | Explanation |
|---|---|---|---|
| RejectHour | Categorical | 16 | Hour of the rejection |
| RejectDoW | Categorical | 5 | Day of the week of the rejection |
| Office | Categorical | BJS1E2RAS | Office of the request |
| Origin | Categorical | GOT | Trip departure (airport) |
| Destination | Categorical | SNA | Trip arrival (airport) |
| Airline | Categorical | QR | Airline |
| FlightDoW | Categorical | 4 | Day of the week of the flight |
| Board | Categorical | GOT | Board point of the flight. Might differ from the trip Origin in case of connecting flights |
| Off | Categorical | DOH | Off point of the flight. Might differ from the trip Destination in case of connecting flights |
| TCC | Categorical | SEL | True City Code of the request originator |

In the exemplary implementation, a dataset comprising 4,205,230 samples was employed, having three possible values for the labelled target: NORTHERN AMERICA (2,259,226 samples); EUROPE (1,303,192 samples); and ASIA (642,812 samples). A distributed random forest algorithm was used, based upon the native handling of categorical features provided by this type of machine learning model. The data was split into 80/20 train/test sets, and following a hyperparameter search the following hyperparameters were selected for final training:
  Number of folds for cross-validation: 4
  Fold_assignment: stratified
  Stopping_metric: logloss
  Stopping_rounds: 3

Stopping_tolerance: 0.001
Number of trees: 500
Mtries: 5
Col_sample_rate_per_tree: 0.8
Number of bins: 512
Max_depth: 30

For this example, training was performed using 24-CPU Linux-based server with 256 GB RAM, which required less than 30 minutes to perform the training step on the whole training dataset and generate a fully working model. The resulting performance of the model on the training dataset is summarised by the following confusion matrix.

| ASIA | EUROPE | NORTHERN AMERICA | Error | Rate |
|---|---|---|---|---|
| 514326 | 15 | 10 | 0.0000486 | 25/514,351 |
| 2 | 1042684 | 13 | 0.0000144 | 15/1,042,699 |
| 1 | 10 | 1807300 | 0.0000061 | 11/1,807,311 |
| 514329 | 1042709 | 1807323 | 0.0000152 | 51/3,364,361 |

Performance on the training dataset is thus very high. To demonstrate that this is not due to overfitting, the following confusion matrix summarised performance on the held-out test dataset.

| ASIA | EUROPE | NORTHERN AMERICA | Error | Rate |
|---|---|---|---|---|
| 128456 | 4 | 1 | 0.0000389 | 5/128,461 |
| 0 | 260490 | 3 | 0.0000115 | 3/260,493 |
| 0 | 2 | 451913 | 0.0000044 | 2/451,915 |
| 128456 | 260496 | 451917 | 0.0000119 | 10/840,869 |

Performance on the test data is also very high, with only 10 samples receiving predictions to the wrong data centre location. The above results therefore clearly confirm the technical viability of using machine learning based data placement in accordance with embodiments of the invention as a means to improve performance, efficiency, and cost of operation of distributed data storage and retrieval systems.

In an alternative embodiment, the feature set was further reduced by removing the 'Office' feature. Advantageously, removal of this feature reduces the granularity of the data, and thereby enables training of the model using a reduced training dataset. In this example, a dataset of ten million samples was employed, again using an 80/20 train/test split. This resulted in performance on the training dataset that is summarised in the following confusion matrix.

| ASIA | EUROPE | NORTHERN AMERICA | Error | Rate |
|---|---|---|---|---|
| 12006 | 60 | 117 | 0.0145284 | 177/12,183 |
| 6 | 24537 | 87 | 0.0037759 | 93/24,630 |
| 231 | 1313 | 41606 | 0.0357822 | 1,544/43,150 |
| 12243 | 25910 | 41810 | 0.0226855 | 1,814/79,963 |

Performance on the test dataset using the reduced feature set is summarised in the following confusion matrix.

| ASIA | EUROPE | NORTHERN AMERICA | Error | Rate |
|---|---|---|---|---|
| 2977 | 13 | 34 | 0.0155423 | 47/3,024 |
| 0 | 6182 | 21 | 0.0033855 | 21/6,203 |
| 53 | 363 | 10394 | 0.0384829 | 416/10,810 |
| 3030 | 6558 | 10449 | 0.0241553 | 484/20,037 |

While performance is not as high as for the larger training dataset, it is nonetheless still very good, achieving an error rate of below 2.5% on the test dataset. However, reducing the number of samples required for training also reduces the communications overhead and cost in the system for transfer of training data, thus providing an alternative benefit. This example therefore demonstrates that, in alternative embodiments of the invention, it is viable to reduce the feature set to achieve a satisfactory compromise between the model's predictive performance and the data volume required for training.

It should be appreciated that while particular embodiments and variations of the invention have been described herein, further modifications and alternatives will be apparent to persons skilled in the relevant arts. In particular, the examples are offered by way of illustrating the principles of the invention, and to provide specific methods and arrangements for putting those principles into effect. Accordingly, the described embodiments should be understood as being provided by way of example, but should not be understood as limiting the scope of the invention, which is as defined in the appended claims.

The invention claimed is:

1. A computer-implemented method, comprising:
    maintaining, in a distributed system, a plurality of databases physically located in corresponding geographic locations, each database storing data records;
    determining a set of training feature vectors, each training feature vector being derived from prior metadata values of a prior request associated with the data records;
    training a machine learning model using the set of training feature vectors, each training feature vector labelled with a corresponding target primary storage database;
    transmitting a copy of the machine learning model to one or more mapper servers of the distributed system;
    determining, by the mapper servers, primary storage databases for the data records by:
        receiving a further request associated with one of the data records, the further request including a plurality of further metadata values;
        processing the further metadata values to determine a prediction feature vector corresponding to the further request; and
        executing the machine learning model using the prediction feature vector as input to identify one database of the plurality of databases as a primary storage database for the one of the data records associated with the further request.

2. The method of claim 1 wherein the further request is a write request, and the method further comprises writing the one of the data records to the primary storage database identified by execution of the machine learning model.

3. The method of claim 1 wherein the further request is a read request, and the method further comprises attempting to read the one of the data records from the primary storage database identified by execution of the machine learning model.

4. The method of claim 3 wherein the one of the data records is not found in the primary storage database, and the method further comprises attempting to read the one of the data records from one or more alternative databases selected from the plurality of databases in the distributed system.

5. The method of claim 3 wherein:
the primary storage database identified by execution of the machine learning model is relatively remote from an origin of the read request;
the plurality of databases includes a preferred database that is relatively local to an origin of the read request; and
the method further comprises recording details of the read request along with details of the preferred database as a target primary storage location, for use in updating the machine learning model.

6. The method of claim 5 further comprising transmitting recorded details of one or more read requests and corresponding target primary storage databases to a cartography server of the distributed system, wherein the cartography server is configured to update the machine learning model.

7. The method of claim 6 further comprising receiving an updated machine learning model from the cartography server.

8. The method of claim 1 further comprising:
receiving, by a cartography server from one or more of the mapper servers, details of one or more requests and corresponding target primary storage databases for which, in each case, a primary storage database identified by execution of the transmitted copy of the machine learning model is different from the target primary storage database;
updating, by the cartography server, the set of training feature vectors based upon the received details of requests; and
training, by the cartography server, the machine learning model using the updated set of training feature vectors and a corresponding set of target primary storage databases.

9. The method of claim 8 wherein the step of training the machine learning model is performed once a threshold is reached in a number of the received details of one or more requests and corresponding target primary storage databases for which, in each case, a primary storage database identified by execution of the transmitted copy of the machine learning model is different from the target primary storage database.

10. The method of claim 8 wherein:
the machine learning model trained using the updated set of training feature vectors is transmitted by the cartography server to the mapper servers as an updated machine learning model; and
the mapper servers are configured subsequently to execute the updated machine learning model to determine primary storage databases for the data records based upon received requests.

11. The method of claim 10 wherein the cartography server associates an activation time with the updated machine learning model, and the mapper servers are configured to execute the updated machine learning model to determine primary storage databases for the data records based upon received requests subsequent to the activation time.

12. The method of claim 1 wherein the databases contain information having geographic significance, and the training and prediction feature vectors comprise geographic elements.

13. The method of claim 12 wherein the information having geographic significance comprises travel information, and wherein one or more of the geographic elements are selected from the group comprising: a requesting office identifier; a requesting office location identifier; a trip origin location identifier; a trip destination location identifier; a travel service provider identifier; a service day-of-week identifier; a service boarding location identifier; and a service offloading location identifier.

14. A distributed system comprising:
a plurality of databases each storing data records, wherein each database is physically located in a corresponding geographic location;
a plurality of mapper servers; and
at least one cartography server,
wherein the data store, mapper servers and cartography server are communicably connected via a distributed data network,
wherein the cartography server is configured to generate a machine learning model by:
determining a set of training feature vectors, each training feature vector being derived from prior metadata values a prior request associated with the data records;
training the machine learning model using the set of training feature vectors, each training feature vector labelled with a corresponding target primary storage database; and
transmitting copies of the machine learning model to the plurality of mapper servers,
wherein each one of the plurality of mapper servers is configured to determine a primary storage database for a data record, from the plurality of databases, by:
receiving a copy of the machine learning model from the cartography server;
receiving a further request associated with one of the data records, the further request including a plurality of metadata values;
processing the metadata values to determine a prediction feature vector corresponding to the further request; and
executing the machine learning model using the prediction feature vector as input to identify one database of the plurality of data stores as the primary storage database for the one of the data records associated with the location request.

* * * * *